United States Patent [19]

Pecukonis

[11] Patent Number: 5,089,997
[45] Date of Patent: Feb. 18, 1992

[54] ULTRASONIC ENERGY DETECTOR WITH FREQUENCY AND AMPLITUDE INDICATIONS AND BACKGROUND NOISE REDUCTION

[75] Inventor: Joseph P. Pecukonis, Denver, Colo.

[73] Assignee: Pasar, Inc., Denver, Colo.

[21] Appl. No.: 608,260

[22] Filed: Nov. 2, 1990

[51] Int. Cl.⁵ .............................................. H04B 1/06
[52] U.S. Cl. ................................. 367/135; 367/901; 367/116
[58] Field of Search ............... 367/901, 116, 135, 125, 367/126, 136, 107

[56] References Cited

U.S. PATENT DOCUMENTS

| | | | |
|---|---|---|---|
| 2,008,934 | 7/1935 | Smith | 73/40.5A |
| 2,884,624 | 4/1959 | Dean et al. | 73/40.5A |
| 2,940,302 | 6/1960 | Scherbatskoy | 73/40.5A |
| 3,028,450 | 4/1962 | Manning | 73/40.5A |
| 3,168,824 | 2/1965 | Florer et al. | 73/40.5A |
| 3,170,152 | 2/1965 | Long | 73/40.5A |
| 3,190,111 | 6/1965 | Trussell et al. | 73/600 |
| 3,192,516 | 6/1965 | Simpkins et al. | 73/40.5A |
| 3,253,457 | 5/1966 | Pakala et al. | 73/40.5A |
| 3,289,465 | 12/1966 | Parker | 367/910 |
| 3,308,424 | 3/1967 | Simpkins et al. | 367/135 |
| 3,421,109 | 1/1969 | Wiggins, et al. | 310/318 |
| 3,462,240 | 8/1969 | Bosselaar et al. | 73/40.5A |
| 3,500,070 | 3/1970 | Adams | 307/513 |
| 3,500,676 | 3/1970 | Palmer | 73/40.5A |
| 3,561,256 | 2/1971 | Bustin et al. | 73/40.5A |
| 3,575,040 | 4/1971 | Bosselaar | 73/40.5A |
| 3,586,919 | 6/1971 | Harris | 367/197 |
| 3,592,967 | 7/1971 | Harris | 367/180 |
| 3,594,768 | 7/1971 | Harris | 367/112 |
| 3,814,207 | 6/1974 | Kusuda et al. | 73/40.5A |
| 3,838,593 | 10/1974 | Thompson | 367/125 |
| 3,930,556 | 1/1976 | Kusuda et al. | 73/40.5A |
| 3,976,988 | 8/1976 | Fujimoto | 367/901 |
| 3,978,915 | 9/1976 | Harris | 73/40.5A |
| 4,012,944 | 3/1977 | Covington et al. | 73/40.5R |
| 4,041,441 | 8/1977 | Johnson | 367/116 |
| 4,083,229 | 4/1978 | Anway | 73/40.5A |
| 4,144,743 | 3/1979 | Covington et al. | 73/40.5R |
| 4,287,581 | 9/1981 | Neale, Sr. | 367/135 |
| 4,309,576 | 1/1982 | Corrigan | 367/180 |
| 4,327,576 | 4/1982 | Dickey et al. | 73/40.5A |
| 4,416,145 | 11/1983 | Goodman et al. | 73/40.5A |
| 4,455,863 | 6/1984 | Huebler et al. | 73/40.5A |
| 4,583,406 | 4/1986 | Dimeff | 73/40.5A |
| 4,785,659 | 11/1988 | Rose et al. | 73/40.5A |

Primary Examiner—Daniel T. Pihulic
Attorney, Agent, or Firm—John R. Ley; Robert G. Crouch

[57] ABSTRACT

An ultrasonic energy detector advantageously supplies both frequency and amplitude information which is related to the ultrasonic frequency and the amplitude of the detected ultrasonic energy. Frequency division is employed to reduce the relatively broad range of ultrasonic frequencies into a narrower audio frequency range while still providing information useful to identify the ultrasonic energy by frequency detection. The effect of anticipated background noise at all levels of gain selected is eliminated by subtracting a signal representative of the anticipated background noise and proportional to the selected predetermined gain from the amplitude of the detected ultrasonic energy.

31 Claims, 4 Drawing Sheets

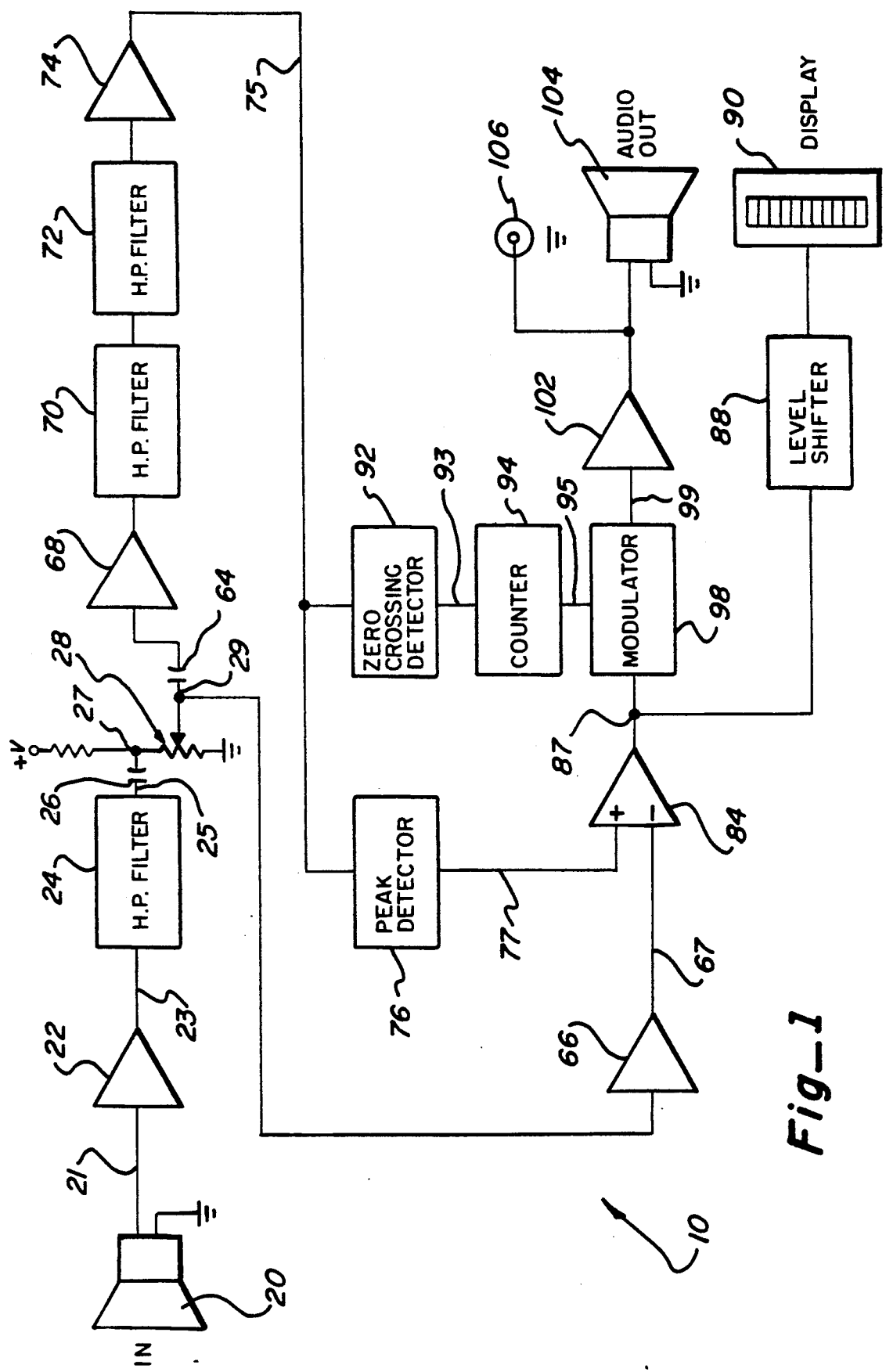
Fig_1

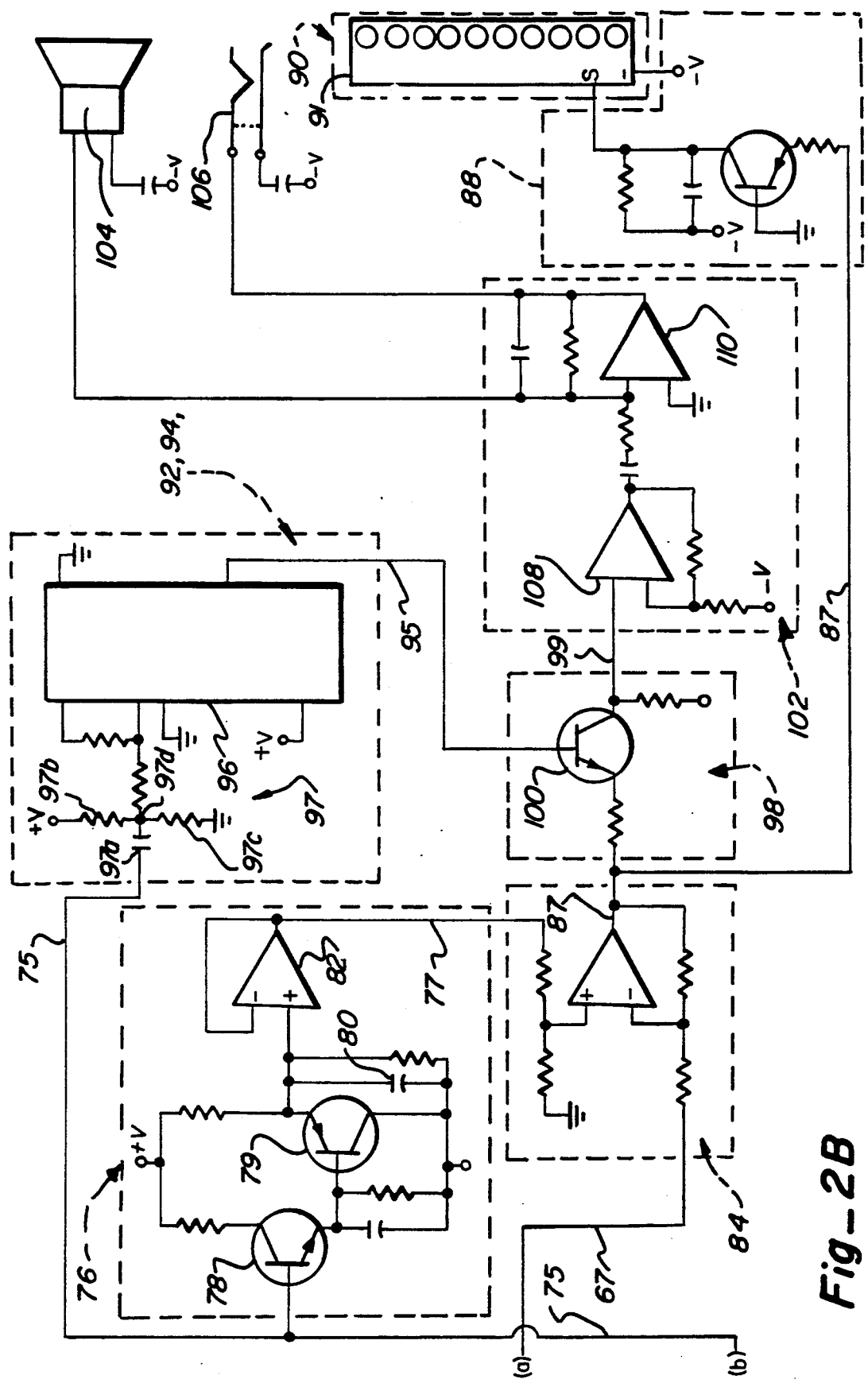
Fig_2B

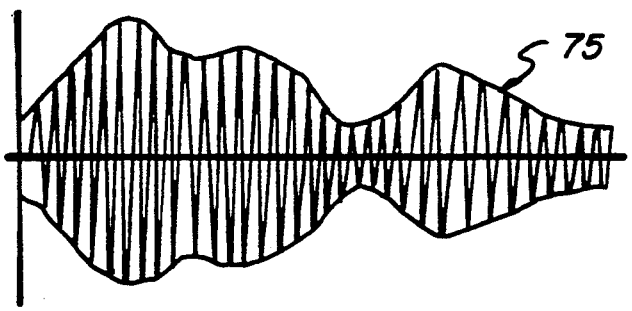
Fig_3A
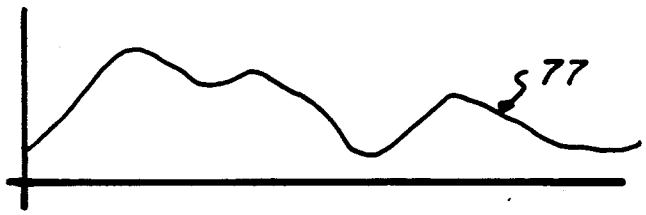
Fig_3B
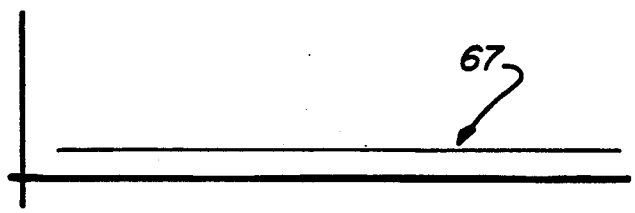
Fig_3C
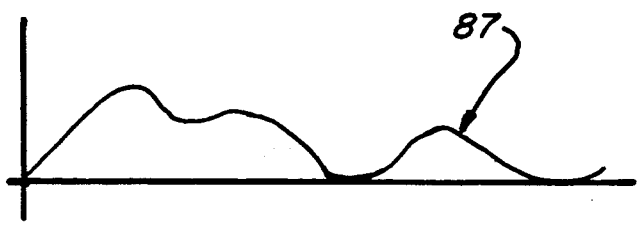
Fig_3D
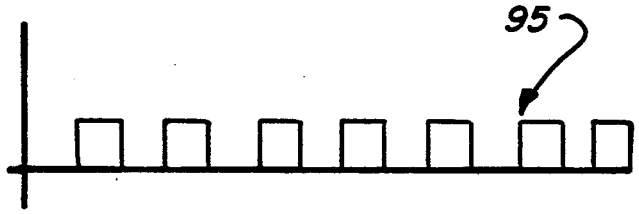
Fig_3E
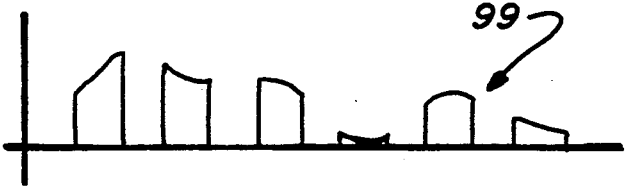
Fig_3F

ULTRASONIC ENERGY DETECTOR WITH FREQUENCY AND AMPLITUDE INDICATIONS AND BACKGROUND NOISE REDUCTION

This invention relates to detecting ultrasonic energy, and more particularly to a new and improved method and apparatus for facilitating the detection of ultrasonic energy by providing humanly perceptible indications directly related to the frequency and amplitude of the detected ultrasonic energy.

BACKGROUND OF THE INVENTION

Ultrasonic energy is transmitted by vibrations at a frequency above the range of human hearing. Consequently ultrasonic energy cannot be humanly perceived. Ultrasonic energy is transmitted as energy waves from a variety of environmental sources, such as electrical arcs, machinery, insects and animals, and leaks in pressurized fluid systems, as well as from ultrasonic wave generators.

Different sources may produce ultrasonic waves at different frequencies. In general the amplitude of the ultrasonic waveform diminishes with the distance from its source, typically in a logarithmic or exponential relationship. This relationship makes it difficult to precisely identify ultrasonic sources at significant distances. In addition, background noise may contribute energy to the ambient environment to make detection of a specific source of ultrasonic energy more difficult or impossible, particularly at significant distances. For example, a small source of ultrasonic energy such as a small leak of gas or liquid, may be almost indistinguishable from the background noise.

Ultrasonic energy detectors are used to search for and locate sources of ultrasonic energy, since such sources cannot be humanly perceived. Sometimes, an ultrasonic wave generator is placed inside an enclosure and the detector is moved over the outside of the enclosure to locate leaks. In other cases, the escape of the pressurized fluid from a container can itself generate ultrasonic energy which may be detected without the use of a separate ultrasonic generator.

A particular ultrasonic energy source may be located by detecting the frequency associated with the particular source and distinguishing it from sources at other frequencies, or by distinguishing changes in the intensity of the detected energy relative to the physical location of the detector relative to the leak or source. The difficulties of rapid and effective detection are particularly acute in an environment where other competing ultrasonic energy sources are present. For example, a pump used to create a vacuum in a pressure vessel may emit ultrasonic energy at a particular ultrasonic frequency, and the ultrasonic energy emitted from the pump may mask the ultrasonic energy emitted from a pressure leak in the vessel. These difficulties can be exacerbated, if other ambient ultrasonic noises are present which must be distinguished while searching for the energy source.

There are a variety of ultrasonic energy detectors available to detect ultrasonic energy, but in many circumstances, these prior art detectors fail to provide enough information to accurately and quickly locate the source of the ultrasonic energy. The typical previous detector derives information regarding only one of either the amplitude or frequency of the ultrasonic source. Often, detecting only the amplitude or only the frequency is insufficient to efficiently locate and detect the ultrasonic source such as a leak.

Amplitude information may be influenced by background noise, which may obscure the true source of the ultrasonic energy, particularly when the magnitude of the ultrasonic energy is small compared to the magnitude of the background noise. The background noise may be such a significant component that it is impossible to distinguish between the background noise and the ultrasonic energy source. Visual or audible displays of the detected energy from such detectors typically contain so much background noise that they fail to accurately represent the amount of ultrasonic energy emitted from the source.

Frequency information is also available from some prior art ultrasonic detectors. The prevalent technique used to derive frequency information in ultrasonic frequency detectors is heterodyning. Heterodyning is a technique of mixing the detected ultrasonic signal with a second fixed frequency signal to obtain a "beat" signal having frequency equal to the difference between the two mixed signals. By careful selection of the fixed frequency signal relative to the expected range of the frequency of the detected ultrasonic signal, the resulting beat signal is in the audible range, thereby facilitating its human recognition.

One drawback of heterodyning is that the fixed frequency and the detected signals must occupy a relatively limited frequency relationship, or otherwise the beat signal will be outside of the audible range and therefore imperceptible. For example, the ultrasonic frequency range from 20 kHz to 200 kHz is 180 kHz in width. If signals in this range are heterodyned with a 200 kHz signal, difference frequencies from 0 to 180 kHz are produced, but only those frequencies up to 20 kHz are perceptible because they are within the audio range. Therefore, if the frequency of the source of emitted ultrasonic energy is not close to the fixed frequency, no perceptible frequency information will be produced.

Another drawback to heterodyning is that the resultant beat signal is representative of the frequency characteristics of the detected ultrasonic signal only over a relatively narrow frequency range of not greater than 20 kHz. For example if the detected ultrasonic signal continually varies in frequency over a range of 50 kHz due to variable effects at the leak in the pressure vessel or from other sources, the maximum variation in frequency which is perceivable is 20 kHz of the 50 kHz range. Furthermore with heterodyning, there is no proportional relationship between the frequency of the detected ultrasonic signal and the beat signal over the full ultrasonic range of possible detected signals. Another disadvantage of heterodyning is that the circuitry required is relatively complex and expensive.

Although frequency division has been used in ultrasonic detectors, detectors utilizing frequency division still do not provide sufficient information which simulates the normal frequency and amplitude information typical of audible sources. Consequently, ultrasonic leaks and other ultrasonic energy sources are sometimes difficult to detect efficiently and effectively with prior art detectors. It is with respect to this and other background information that the present invention has resulted.

SUMMARY OF THE INVENTION

The ultrasonic energy detector of the present invention offers the new, improved and advantageous capability to provide humanly perceptible and useful information directly related to the frequency and amplitude of a detected ultrasonic energy source over a wide ultrasonic frequency spectrum while avoiding substantial adverse influences from background noise, thereby facilitating the more effective and efficient detection of the ultrasonic energy source.

In accordance with the major aspects of the present invention, a detected ultrasonic signal is frequency divided to obtain an audio frequency trigger signal having a frequency that is directly related to the frequency of the detected ultrasonic signal over a significantly broad segment of the ultrasonic range. The significantly broad ultrasonic frequency range is condensed into the audio frequency range, thereby preserving considerably more of the frequency information which would otherwise be lost due to heterodyning. The amplitude of the detected ultrasonic signal is used to develop an envelope signal which is related to the peak values of each cycle of the detected ultrasonic signal. An offset signal proportional to the anticipated background noise at the selected gain of the detector is subtracted to obtain a compensated signal representative of the amplitude of the detected ultrasonic signal which is substantially free of the anticipated influence of background noise. The compensated signal is modulated by the related audio frequency trigger signal to produce a humanly perceptible output signal which has frequency and amplitude information that is directly related to and derived from the ultrasonic energy emitted from the source and which is substantially uninfluenced by anticipated background noise. These improved characteristics of the output signal lead to an enhanced capability to detect, locate and identify sources of ultrasonic energy in an environment containing background noise.

A more complete understanding and appreciation of the present invention can be obtained by reference to the accompanying drawings, which are briefly described below, from the following detailed description of a presently preferred embodiment, and from the appended claims.

DETAILED DESCRIPTION OF THE DRAWINGS

FIG. 1 is a block diagram of components of an ultrasonic energy detector incorporating the present invention.

FIGS. 2A and 2B are separate portions of a single schematic circuit diagram of the components of the ultrasonic energy detector shown in FIG. 1.

FIGS. 3A to 3F are waveform diagrams illustrating signals present at various points in the diagrams shown in FIGS. 1, 2A and 2B.

DETAILED DESCRIPTION

Figure 2A:
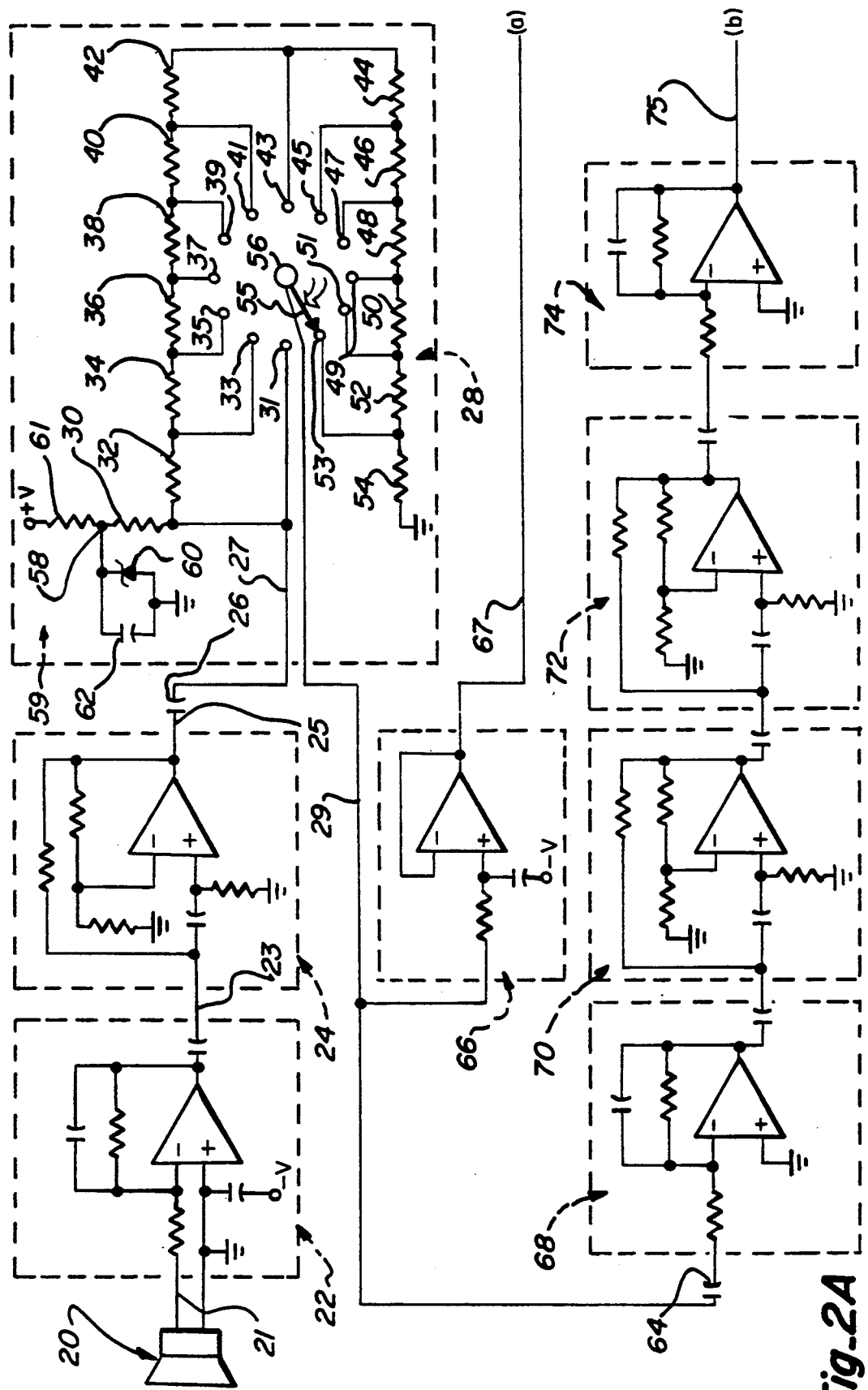

A preferred embodiment of an ultrasonic energy detector 10 which incorporates the present invention is shown in FIGS. 1, 2A and 2B. The detector 10 includes a conventional ultrasonic transducer 2 which receives ultrasonic wave energy transmitted to it from the ambient environment and converts the received energy into a detected signal supplied at 21. The detected signal 21 has frequency and amplitude characteristics that substantially correspond to the frequency and amplitude of the ambient ultrasonic energy impinging on the transducer 20, including noise and other source components in the environment in which the detector 10 is used. The detected signal 21 is amplified by a conventional amplifier 22 to produce a amplified detected signal at 23, which is an amplified version of the detected signal 21. The amplified detected signal 23 is supplied to a conventional high pass filter 24 which filters out the undesired low frequency audio signals and produces an ultrasonic detected signal at 25 which has frequency characteristics substantially only in the ultrasonic range. The amplifier 22 and the high pass filter 24 are conventional, as shown in FIG. 2A, and each preferably uses an operational amplifier, with resistors and capacitors connected in the feedback path and to the input terminals to obtain the desired amplifying and high pass filtering functionality.

The ultrasonic detected signal 25 is supplied to a blocking capacitor 26. The blocking capacitor 26 eliminates any DC component and passes a pure AC ultrasonic signal at 27 which contains substantially only the frequency and amplitude components of the ultrasonic detected signal 25 including any ultrasonic components of ambient noise.

The ultrasonic signal 27 is supplied to a variable attenuator 28, which derives and supplies an output signal at 29. The signal 29 contains a first, gain-adjusted ultrasonic detected signal component (derived from the signal 27) and a second, noise-offsetting signal component (derived by operation of the attenuator). The magnitude of the gain-adjusted ultrasonic signal component establishes the gain and sensitivity of the detector 10. The noise-offsetting signal component is employed to eliminate substantial effects contributed by the anticipated background noise to the detected ultrasonic energy source, thereby eliminating many of the adverse affects of background noise on the detection of ultrasonic energy sources.

The variable attenuator 28 is one example of means for modifying or attenuating the amplitude of the ultrasonic signal 27 by a selected predetermined amount to derive the adjusted ultrasonic detected signal component. The adjusted ultrasonic signal component at 29 is therefore an amplitude attenuated version of the ultrasonic signal 27.

The magnitude of the adjusted ultrasonic signal component includes a predetermined amount of anticipated background noise contributed to the detected signal component in relation to the amount of gain (attenuation) selected at the variable attenuator 28.

To detect relatively weak ultrasonic energy sources, it is frequently necessary to increase the gain of the detector to obtain a signal of sufficient strength to be perceived. However, increasing the gain also amplifies the background noise contribution as well and does not increase the relative ratio of the ultrasonic signal to the background noise, since both signal components are amplified equally. By deriving a separate noise offset signal, by varying the magnitude of the noise offset signal directly in a predetermined relationship with the magnitude of the gain-adjusted ultrasonic signal, and by subtracting the noise offset signal from the magnitude of the adjusted ultrasonic signal, the effects of anticipated background noise may be substantially eliminated or reduced. Ambient ultrasonic energy is more easily detected after eliminating the effect of anticipated background noise. The variable attenuator 28 is also one example of means for deriving and supplying the noise offset signal component.

The manner by which the variable attenuator 28 performs the functions of deriving and supplying the adjusted ultrasonic signal and noise offset signal components is understood by reference to FIG. 2A. The variable attenuator 28 includes a plurality of resistors 30, 32, 34, 36, 38, 40, 42, 44, 46, 48, 50, 52 and 54 connected together in series. The resistor 54 is connected between the terminal 53 and ground, to complete a signal path through the series connected resistors 30 to 54. Terminals 31, 33, 35, 37, 39, 41, 43, 45, 47, 49, 51 and 53 are connected at the junction points between each pair of resistors referenced by even numbers immediately preceding and following the reference number of the terminal. A moveable wiper arm 55 is pivotally connected at a terminal 56 and is selectively positionable to connect the terminal 56 with one of the terminals 31 to 53. The variable attenuator is a form of a potentiometer. The ultrasonic signal 27 is supplied as an AC input signal to the attenuator 28 at terminal 31. A fixed DC voltage is supplied at 58 to the series connected resistors by a Zener diode 60 and a capacitor 62 connected in parallel.

Selective positioning of the wiper arm 55 in contact with one of the terminals determines the amount that both signals 27 and 58 will be attenuated at terminal 56. The amount of attenuation establishes the magnitudes of the adjusted ultrasonic signal and the noise offset signal components of the signal 29. Both of the signals 27 and 58 are attenuated by the same relative amount, since both signals 27 and 58 pass through and are attenuated by the same resistors connected in series. Consequently the same predetermined relative relationship of the magnitudes of these two components is maintained at all positions of the wiper arm 55.

Each position of the wiper arm 55 preferably results in a signal magnitude which is equal to about half of the signal magnitude present at the previous higher, less attenuated position. This establishes an exponential attenuation relationship, which is achieved by the selection of the values of the resistors of the variable attenuator. The exponential attenuation relationship generally creates more sensitivity at greater amounts of attenuation where greater sensitivity is needed to detect low level ultrasonic energy sources. The predetermined amount of anticipated noise compensation achieved is established by selection of the relative ratio of the signals 27 and 58 supplied to the attenuator 28.

A blocking capacitor 64 and the blocking capacitor 26 prevent the DC noise offset signal component at 29 from coupling to the components 24 and 68 of the detector 10, as is shown in FIG. 1. However, the DC noise offset signal component at 29 is supplied to a conventional DC follower operational amplifier 66 which supplies an offset signal at 67 (FIG. 3C). The offset signal 67 is a DC signal of a magnitude essentially the same as or directly related to the noise offset signal component at 29. Consequently the offset signal 67 also represents the contribution of anticipated background noise to the adjusted ultrasonic signal component at 29.

The adjusted ultrasonic signal component of the signal 29 is passed through the blocking capacitor 64 and is applied to an amplifier 68, where the adjusted ultrasonic signal component is amplified and supplied to two series-connected conventional high pass filters 70 and 72 which further remove any sub-ultrasonic components which may have been introduced. The high pass filters 70 and 72, in combination with the high pass filter 24, create a very steep roll-off of the frequency component of the ultrasonic signal at approximately the 20 kHz level to prevent any audio range signals from being passed through the detector 10. Another conventional amplifier 74 achieves further amplification and supplies an amplified and filtered ultrasonic detected signal at 75 which has the characteristics exemplified by FIG. 3A.

The amplified and filtered detected ultrasonic signal 75 is applied to a peak detector 76, as is shown in FIGS. 1 and 2B. The peak detector 76 is one example of means for creating and supplying an envelope signal 77 (FIG. 3B) which has a magnitude that generally follows the peaks or maximum values of each cycle of the amplified and filtered ultrasonic detected signal 75 (FIG. 3A). The envelope signal 77 (FIG. 3B) therefore represents the amplitude or magnitude of the detected ultrasonic energy including the contribution from anticipated background noise. As is shown in FIG. 2B, the peak detector 76 is a conventional circuit, using transistors 78 and 79 to establish a voltage level on a capacitor 80 which is the integration of the peak values of the cycles of the signal 75. The signal on the capacitor 80 is applied to a buffer operational amplifier 82, which creates the envelope signal 77 as a buffered version of the signal appearing across the capacitor 80.

To eliminate the effects of background noise, the offset signal 67 (FIG. 3C) is subtracted from the envelope signal 77 (FIG. 3B) by means of a conventional differential amplifier 84, for example. The signals 67 and 77 are applied at the negative and positive input terminals respectively of the amplifier 84, thereby accomplishing the subtraction. By subtracting the offset signal 67 (FIG. 3C), which represents the contribution of anticipated background noise relative to the level of gain selected, from the envelope signal 77 (FIG. 3B), which represents the detected ultrasonic signal including the background noise, the magnitude of the detected ultrasonic energy source after substantially eliminating the effect of anticipated background noise is obtained. The result of the subtraction is a noise compensated envelope signal 87 (FIG. 3D), which represents the magnitude of the detected ultrasonic energy source after eliminating the effect of anticipated background noise.

The compensated envelope signal 87 (FIG. 3D) is applied to a level shifting circuit 88. The level shifting circuit 88 is of the conventional circuit design which functions to shift the level of the compensated envelope signal 87 to a level compatible for driving a display circuit 90, which visually displays the magnitude of the compensated envelope signal 87 over a predetermined full range of values derived from the amplitude of the signal 87. The display 90 is preferably a conventional bar or dot graph integrated circuit 91, such as an LM 3914, and it supplies a visual indication of the relative magnitude of the detected ultrasonic energy absent the substantial effects of background noise.

As is shown in FIG. 1, the amplified and filtered ultrasonic detected signal 75 (FIG. 3A) is also applied to a zero crossing detector 92. The zero crossing detector 92 supplies a count signal at 93 to a counter circuit 94 each time the amplitude of one of the cycles of the amplified detected signal 75 (FIG. 3A) exceeds a zero or reference potential. The frequency of the signal supplied to the counter 94 is therefore the same as that of the frequency of amplified and filtered ultrasonic detected signal 75 (FIG. 3A). The counter 94 counts a predetermined number of count signals supplied by the detector 92 and upon reaching a predetermined value, e.g. 16, changes output states. The counter 94 thereby supplies a square wave trigger signal 95 (FIG. 3E) having a frequency which is proportionally less than the frequency of the ultrasonic signal 75 by twice the integer value selected for the counter 94 to change states. The counter 94 and the zero crossing detector 92 are one example of means for dividing the ultrasonic frequency of the signal 75 by a fixed integer and for creating and supplying the trigger signal 95 at a frequency which is in the audio frequency range and which is proportional to the ultrasonic frequency of the detected signal 75. Conversion of the frequency from the ultrasonic range to the audio range is obtained by appropriately selecting the count value at which the counter 94 changes states. Using a count value of 16, in the preferred embodiment, (which corresponds to a frequency division of 32) changes the frequency of signals in the inaudible ultrasonic range of 20 kHz to 100 kHz into audio frequencies from 625 Hz to 3,125 Hz.

The functionality of both the zero crossing detector 92 and the counter 94 is preferably achieved by a single conventional integrated circuit divider 96 and an associated input bias network 97 shown in FIG. 2B. The amplified and filtered ultrasonic detected signal 75 is first applied to a capacitor 97a which blocks DC currents and which is connected to the junction of two resistors 97b and 97c. The resistors 97b and 97c are connected at a junction point 97d in series between the voltage supply and ground. The resistors 97b and 97c are equal in value and therefore the voltage at the junction point 97d between resistors 97b and 97c is equal to half the supply voltage. When the amplified and filtered ultrasonic detected signal 75 is superimposed on the DC voltage at the junction point 97d, the signal at the junction point 97d will oscillate about a voltage equal to half of the supply voltage, at the frequency of the signal 75. The divider 96 receives its input signal from the junction point 97d, and the divider circuit 96 is triggered each time the input signal from the input bias network 97 exceeds the level of one half of the supply voltage, which is once per cycle of the amplified and filtered ultrasonic detected signal 75.

The divider circuit 96 counts the number of crossings of the signal 75 through the zero relative magnitude point (the bias point at one-half of the supply voltage), and upon reaching a predetermined count established by the particular output terminal from which the output signal is taken, the trigger signal 95 changes state. The trigger signal 95 toggles back and forth between high and low states in this manner and establishes an output square wave trigger signal (FIG. 3E) at an audio frequency which is substantially less than the frequency of the ultrasonic detected signal 75. For example, the frequency of the trigger signal 95 is equal to 1/32 of the frequency of the ultrasonic detected signal 75. The divider circuit 96 is an integrated circuit, marketed under the part number 4060.

The square-wave, audio-frequency trigger signal 95 (FIG. 3E) from the counter 94 (circuit 96, FIG. 2B), and the compensated envelope signal 87 (FIG. 3D) are applied to a conventional modulator 98. The modulator combines the audio frequency trigger signal 95 with the compensated envelope signal 87 to produce a combined signal 99 (FIG. 3F). The combined signal 99 has the frequency of the audio frequency trigger signal 95, has the analog amplitude of the compensated envelope signal 87 during times that the trigger signal 95 is in the high state, and has no amplitude during times that the trigger signal 95 is in the low state. The modulator 98 is one example of means which accomplishes the summing or combining function by chopping or modulating the compensated envelope signal 87 at the frequency of the trigger signal 95.

One example of the modulator 98 is a switch means such as a transistor 100, as shown in FIG. 2B. The trigger signal 95 is applied to the base terminal of the transistor 100 to control the switching and conductivity of the transistor 100. When the trigger signal 95 is in the high state, the transistor 100 is conductive, and the compensated envelope signal 87 is conducted substantially unmodified through the transistor 100 as the combined signal 99. When the trigger signal 95 is in the low state, the transistor 100 is nonconductive, and the combined signal 99 is also at a ground level or low state.

An amplifier 102 receives the compensated signal 99 from the modulator 98 and conditions it to a magnitude sufficient to drive an audio loudspeaker 104 and/or to drive headphones (not shown) from a jack 106, as is shown in FIGS. 1 and 2B. The amplifier 102 includes two operational amplifiers 108 and 110, arranged in a series amplifying manner. The amplifier 108 conditions the signal supplied to the loudspeaker 10B, and the amplifier 110 is employed to derive a separate signal of a magnitude suitable for driving the headphones when connected to the jack 108.

The ultrasonic energy detector of the present invention achieves substantial advantages and improvements. The information available from the detector describes an audio frequency which is directly related to the frequency of the detected ultrasonic energy and an amplitude or intensity which is related to the magnitude of the detected ultrasonic energy. The simultaneous presentation of the amplitude and frequency information is of great value in detecting, identifying and locating ultrasonic energy sources on an efficient and effective basis. In addition a visual display of the amplitude information is also provided to supplement the audible amplitude information provided. This improved functionality is accomplished without expensive and complex heterodyning, and the entire or a substantial portion of the ultrasonic frequency range is compressed into a narrower audio frequency range, while still maintaining a direct relationship between variations in the ultrasonic frequency detected and the audio output information provided. Other advantages and improvements will be apparent upon full appreciation of the present invention.

The presently preferred embodiment of the present invention has been described above with a degree of specificity. It should be understood, however, that this description has been made by way of preferred example and that the invention itself is defined by the scope of the appended claims.

The invention claimed is:

1. A detector for detecting ultrasonic energy in an ambient environment and for supplying humanly perceptible information representative of the magnitude and frequency of the detected ultrasonic energy which is significantly free of adverse influences from anticipated ambient environmental noise, comprising:
   means receptive of the ambient ultrasonic energy and operative for supplying a detected signal representative of the frequency and amplitude of the ambient ultrasonic energy;
   means receptive of the detected signal and operative for modifying the amplitude of the detected signal by a selected predetermined amount and for supplying the resulting signal as an adjusted ultrasonic detected signal;

means for supplying an offset signal of a predetermined magnitude directly related to the predetermined amount of modification of the adjusted ultrasonic detected signal relative to the detected signal, the predetermined magnitude of the offset signal representing a predetermined contribution of anticipated noise to the amplitude of the adjusted ultrasonic detected signal;

means receptive of the adjusted ultrasonic detected signal and operative for supplying an envelope signal having a magnitude substantially representative of the instantaneous peak amplitude of the adjusted ultrasonic detected signal;

means responsive to the adjusted ultrasonic detected signal and operative for supplying an audio frequency trigger signal having a predetermined frequency directly related to the ultrasonic frequency of the adjusted ultrasonic detected signal;

means receptive of the envelope and the offset signals and operative for subtracting the offset signal from the envelope signal and for supplying the resulting signal as a compensated envelope signal; and means receptive of the trigger signal and the compensated envelope signal for modulating the amplitude of the compensated envelope signal by the trigger signal to obtain an output signal having an audio frequency directly related to the ultrasonic frequency of the detected ultrasonic energy and an amplitude directly related to the amount of detected ultrasonic energy substantially free of predetermined degree of anticipated ambient noise.

2. A detector as defined in claim 1 wherein the audio frequency of the output signal is directly proportional to the frequency of the adjusted ultrasonic detected signal.

3. A detector as defined in claim 2 wherein the trigger signal supplying means further comprises:

means for counting each cycle of the adjusted ultrasonic detected signal and for supplying a count signal upon the occurrence of each cycle of the adjusted ultrasonic detected signal; and means receptive of the count signal and operative for dividing the number of count signals by a predetermined integer and for supplying the resulting signal as the trigger signal, the predetermined integer establishing the frequency of the trigger signal in the audio frequency range.

4. A detector as defined in claim 3 wherein the envelope signal supplying means comprises:

peak detector means responsive to each cycle of the adjusted ultrasonic detected signal and operative for integrating the maximum amplitudes of each cycle of the adjusted ultrasonic detected signal into the envelope signal.

5. A detector as defined in claim 4 wherein:

the trigger signal is a repetitive waveform having a high state and a low state; and said modulating means further comprises:

switch means receptive of the envelope signal and responsive to the count signal for conducting the compensated envelope signal during one state of the count signal and for blocking the conduction of the compensated envelope signal during the other state of the count signal.

6. A detector as defined in claim 5 wherein the means for counting each cycle further comprises:

a zero crossing detector means responsive to the amplitude of each cycle of the adjusted ultrasonic detected signal passing through a zero relative value and for supplying the count signal in response thereto.

7. A detector as defined in claim 6 wherein the predetermined integer is a value selected to limit the maximum audio frequency of the output signal to within approximately the lower half of the audio frequency range.

8. A detector as defined in claim 1 wherein the magnitude of the envelope signal is substantially representative of the peak amplitude of each cycle of the adjusted ultrasonic detected signal.

9. A detector as defined in claim 8 wherein the envelope signal supplying means comprises:

peak detector means responsive to each cycle of the adjusted ultrasonic detected signal and operative for integrating the maximum amplitudes of each cycle of the adjusted ultrasonic detected signal into the envelope signal.

10. A detector as defined in claim 1 wherein the audio frequency signal supplying means further comprises:

means receptive of the adjusted ultrasonic detected signal and operative in response to the amplitude of each cycle of the adjusted ultrasonic detected signal passing through a zero relative value for supplying the count signal; and means receptive of the count signal and operative for dividing the number of count signals by a predetermined integer and for supplying the audio frequency trigger signal in response to predetermined integer number of count signals.

11. A detector as defined in claim 1 wherein:

the means for modifying the amplitude of the detected signal further comprises means for selecting a predetermined amount of gain by which the detected signal is modified when supplied as the adjusted ultrasonic signal; and the means for supplying the offset signal further comprises means for selecting a predetermined amount of attenuation by which to attenuate a fixed signal and for supplying the resulting signal as the offset signal; and the predetermined amounts of attenuation and gain have a predetermined relationship with one another.

12. A detector as defined in claim 11 wherein the means for selecting the predetermined amount of gain and the means for selecting the predetermined amount of attenuation are directly operatively interconnected to select the predetermined amounts of gain and attenuation in a fixed predetermined relationship with each other.

13. A detector as defined in claim 12 wherein the means for selecting the predetermined amount of gain and the means for selecting the predetermined amount of attenuation include a single variable impedance through which the detected signal and the fixed signal are commonly conducted, the single variable impedance establishing both the amount of gain and the amount of attenuation.

14. A detector as defined in claim 13 wherein the single variable impedance comprises a potentiometer having a total resistance through which the detected signal and the fixed signal are commonly conducted and a wiper member operative for contacting the total resistance at a selected one of a plurality of different terminals, each terminal establishing a different amount of resistance by which to establish the amounts of gain and attenuation.

15. A detector as defined in claim 1 further comprising:
means receptive of the compensated envelope signal for displaying the magnitude of the compensated envelope signal.

16. A detector as defined in claim 15 further comprising:
means receptive of the output signal for producing an audio tone having an amplitude and a frequency established by the output signal.

17. A detector as defined in claim 1 further comprising:
means receptive of the output signal for producing an audio tone having an amplitude and a frequency established by the output signal.

18. A detector for detecting ultrasonic energy in an ambient environment and for supplying humanly perceptible information representative of the magnitude and frequency of the detected ultrasonic energy, to thereby enhance recognition of the characteristics of the ultrasonic energy, comprising:
means receptive of the ambient ultrasonic energy and operative for supplying a detected signal representative of the frequency and amplitude of the ambient ultrasonic energy;
means receptive of the detected signal and operative for modifying the amplitude of the detected signal by a selected predetermined amount and for supplying the resulting signal as an adjusted ultrasonic detected signal;
means receptive of the adjusted ultrasonic detected signal and operative for supplying an envelope signal having a magnitude substantially representative of the instantaneous peak amplitude of the adjusted ultrasonic detected signal;
means responsive to the adjusted ultrasonic detected signal and operative for supplying an audio frequency trigger signal having a predetermined frequency directly related to the ultrasonic frequency of the adjusted ultrasonic detected signal; and
means receptive of the trigger signal and the envelope signal for modulating the amplitude of the envelope signal by the trigger signal to obtain an output signal having an audio frequency directly related to the ultrasonic frequency of the detected ultrasonic energy and an amplitude directly related to the amount of detected ultrasonic energy.

19. A detector as defined in claim 18 wherein the trigger signal supplying means further comprises:
means for counting each cycle of the adjusted ultrasonic detected signal and for supplying a count signal upon the occurrence of each cycle of the adjusted ultrasonic detected signal; and
means receptive of the count signal and operative for dividing the number of count signals by a predetermined integer and for supplying the resulting signal as the trigger signal, the predetermined integer establishing the frequency of the trigger signal in the audio frequency range.

20. A detector as defined in claim 19 wherein the envelope signal supplying means comprises:
peak detector means responsive to each cycle of the adjusted ultrasonic detected signal and operative for integrating the maximum amplitudes of each cycle of the adjusted ultrasonic detected signal into the envelope signal.

21. A detector as defined in claim 20 wherein:
the trigger signal is a repetitive waveform having a high state and a low state; and
said modulating means further comprising switch means receptive of the envelope signal and responsive to the trigger signal for conducting the envelope signal during one state of the trigger signal and for blocking the envelope signal during the other state of the trigger signal.

22. A detector as defined in claim 21 wherein the means for counting each cycle further comprises:
a zero crossing detector means responsive to the amplitude of each cycle of the adjusted ultrasonic detected signal passing through a zero relative value and for supplying the count signal in response thereto.

23. A detector as defined in claim 22 wherein the predetermined integer is a value selected to limit the maximum audio frequency of the output signal to within approximately the lower half of the audio frequency range.

24. A detector as defined in claim 23 wherein the maximum audio frequency of the output signal is limited to approximately 3.125 kHz.

25. A detector for detecting ultrasonic energy in an ambient environment and for supplying humanly perceptible information representative of the magnitude of the detected ultrasonic energy, to thereby enhance recognition of the characteristics of the ultrasonic energy substantially free of adverse influences from anticipated noise in the ambient environment, comprising:
means receptive of the ambient ultrasonic energy and operative for supplying a detected signal representative of the amplitude of the ambient ultrasonic energy;
means receptive of the detected signal and operative for modifying the amplitude of the detected signal by a selected predetermined amount and for supplying the resulting signal as an adjusted ultrasonic detected signal;
means for supplying an offset signal of a predetermined magnitude directly related to the predetermined amount by which the adjusted ultrasonic detected signal is modified relative to the detected signal, the predetermined magnitude of the offset signal representing a predetermined contribution of anticipated noise to the amplitude of the adjusted ultrasonic detected signal;
means receptive of the adjusted ultrasonic detected signal and operative for supplying an envelope signal having a magnitude substantially representative of the instantaneous peak amplitude of the adjusted ultrasonic detected signal;
means receptive of the envelope and the offset signals and operative for subtracting the offset signal from the envelope signal and for supplying the resulting signal as a compensated envelope signal; and
means receptive of the compensated envelope signal for displaying the magnitude of the compensated envelope signal.

26. A detector as defined in claim 25 wherein:
the means for modifying the amplitude of the detected signal further comprises means for selecting a predetermined amount of gain by which the detected signal is modified when supplied as the adjusted ultrasonic detected signal;
the means for supplying the offset signal further comprises means for selecting a predetermined amount of attenuation by which to attenuate a fixed signal for supplying the resulting signal as the offset signal; and the predetermined amounts of attenuation and gain have a predetermined fixed relationship with one another.

27. A detector as defined in claim 26 wherein the means for selecting the predetermined amount of gain and the means for selecting the predetermined amount of attenuation are directly operatively interconnected to select the amount of gain and the amount of attenuation in equal increments.

28. A detector as defined in claim 27 wherein the means for selecting the amount of gain and the means for selecting the amount of attenuation comprise a single variable impedance through which the detected signal and the fixed signal are commonly conducted, the amount of impedance established by the variable impedance establishing both the predetermined amount of gain and the predetermined amount of attenuation.

29. A detector as defined in claim 28 wherein the single variable impedance comprises a single potentiometer having a total resistance through which the detected signal and the fixed signal are commonly conducted and a wiper member operative for contacting the total resistance at a selected one of a plurality of different terminals, each position establishing a different amount of resistance by which to establish the amounts of gain and attenuation.

30. A method of detecting ultrasonic energy in an ambient environment and for supplying humanly perceptible information representative of the magnitude and frequency of the detected ultrasonic energy which is significantly free of adverse influences from anticipated noise in the ambient environment, comprising:

supplying a detected signal representative of the frequency and amplitude of the ambient ultrasonic energy;

modifying the amplitude of the detected signal by a selected predetermined amount and supplying the resulting signal as an adjusted ultrasonic detected signal;

supplying an offset signal of a predetermined magnitude directly related to the predetermined amount of modification of the adjusted ultrasonic detected signal relative to the detected signal, the predetermined magnitude of the offset signal representing a predetermined contribution of anticipated noise to the amplitude of the adjusted ultrasonic detected signal;

supplying an envelope signal having a magnitude substantially representative of the instantaneous peak amplitude of the adjusted ultrasonic detected signal;

supplying a trigger signal having a predetermined audio frequency directly related to the ultrasonic frequency of the adjusted ultrasonic detected signal;

subtracting the offset signal from the envelope signal and for supplying the resulting signal as a compensated envelope signal; and modulating the compensated envelope signal by the trigger signal to obtain an output signal having an audio frequency directly related to the ultrasonic frequency of the detected ultrasonic energy and an amplitude directly related to the amount of detected ultrasonic energy substantially free of a predetermined degree of anticipated ambient noise.

31. A method as defined in claim 30 further comprising:

selecting a predetermined amount of gain by which the detected signal is modified when supplied as the adjusted ultrasonic detected signal;

generating a fixed signal by which to derive the offset signal;

selecting a predetermined amount of attenuation by which to attenuate the fixed signal;

attenuating the fixed signal by the predetermined amount of attenuation and supplying the resulting signal as the offset signal; and selecting the predetermined amounts of attenuation and gain in a fixed relationship with one another.

* * * * *